United States Patent
Collet

(10) Patent No.: US 9,856,598 B2
(45) Date of Patent: Jan. 2, 2018

(54) HOUSEHOLD ELECTRICAL IRONING APPLIANCE COMPRISING A FILTER DESIGNED TO RETAIN LIME SCALE PARTICLES TRANSPORTED BY THE STEAM

(71) Applicant: SEB S.A., Ecully (FR)

(72) Inventor: Frederic Collet, Vienne (FR)

(73) Assignee: SEB S.A., Ecully (FR)

( * ) Notice: Subject to any disclaimer, the term of this patent is extended or adjusted under 35 U.S.C. 154(b) by 30 days.

(21) Appl. No.: 15/058,307

(22) Filed: Mar. 2, 2016

(65) Prior Publication Data
US 2016/0258109 A1 Sep. 8, 2016

(30) Foreign Application Priority Data

Mar. 3, 2015 (FR) ...................... 15 51789

(51) Int. Cl.
*D06F 75/16* (2006.01)
*D06F 75/14* (2006.01)
*B01D 46/00* (2006.01)

(52) U.S. Cl.
CPC ............. *D06F 75/16* (2013.01); *B01D 46/00* (2013.01); *B01D 46/0006* (2013.01); *D06F 75/14* (2013.01)

(58) Field of Classification Search
CPC .......... D06F 75/06–75/20; D06F 75/24; B01D 46/00; B01D 46/0002; B01D 46/0004; B01D 46/0005; B01D 46/0006; B01D 46/0008
See application file for complete search history.

(56) References Cited

U.S. PATENT DOCUMENTS

| | | | | |
|---|---|---|---|---|
| 4,057,918 A * | 11/1977 | Zeier | ...................... | D06F 75/18 38/77.3 |
| 4,240,217 A * | 12/1980 | Schwob | .................. | D06F 75/18 38/77.83 |
| 4,854,059 A * | 8/1989 | Ronchi | .................... | D06F 75/12 38/77.8 |
| 5,345,704 A | 9/1994 | Guillot et al. | | |
| 6,212,332 B1 * | 4/2001 | Sham | ...................... | D06F 75/12 38/77.6 |
| 8,881,434 B2 * | 11/2014 | Date | ...................... | D06F 75/16 38/77.82 |
| 2005/0183296 A1 * | 8/2005 | Lesaga | ................... | D06F 75/18 38/77.82 |

FOREIGN PATENT DOCUMENTS

| | | |
|---|---|---|
| DE | 102004032361 A1 | 8/2005 |
| EP | 0569822 A1 | 5/1993 |
| EP | 0711862 A1 | 5/1996 |
| FR | 2979924 A1 | 3/2013 |
| FR | 2981371 A1 | 4/2013 |

\* cited by examiner

*Primary Examiner* — Ismael Izaguirre
(74) *Attorney, Agent, or Firm* — The Webb Law Firm

(57) ABSTRACT

An ironing appliance including a steam distribution circuit having at least one filter designed to retain lime scale particles transported by the steam flow, wherein it includes a lime scale disposal orifice that communicates with a portion of the steam distribution circuit located upstream of the filter and that said filter is fixedly mounted in the appliance or is removable via an orifice separate from the lime scale disposal orifice.

11 Claims, 4 Drawing Sheets

HOUSEHOLD ELECTRICAL IRONING APPLIANCE COMPRISING A FILTER DESIGNED TO RETAIN LIME SCALE PARTICLES TRANSPORTED BY THE STEAM

CROSS-REFERENCE TO RELATED APPLICATION

This application claims priority to French Patent Application No. 1551789 filed Mar. 3, 2015, the disclosure of which is hereby incorporated in its entirety by reference.

FIELD OF THE INVENTION

The present invention relates to an iron comprising an instantaneous steam generation chamber connected to steam outlet holes via a steam distribution circuit having a filter designed to retain at least a portion of the lime scale particles transported by the steam flow.

DESCRIPTION OF RELATED ART

Patent application no. FR2979924 filed by the applicant discloses an iron having a steam distribution circuit connecting an instantaneous steam generation chamber to steam outlet holes formed in the soleplate of the iron. In this document, the steam distribution circuit comprises a filter designed to retain lime scale particles transported by the steam flow exiting the steam generation chamber.

Such an iron has the advantage of retaining the largest lime scale particles upstream of the filter and thus preventing them from being discharged via the steam outlet holes of the soleplate and staining the laundry.

However, such an iron has the disadvantage of having a steam distribution circuit that gradually becomes obstructed with lime scale particles upstream of the filter such that the performance of the appliance, and in particular the steam flow, deteriorate over time.

Hence an object of the present invention is to propose an ironing appliance that remedies these disadvantages.

SUMMARY OF THE INVENTION

To this end, the invention relates to an ironing appliance comprising a steam distribution circuit having at least one filter designed to retain lime scale particles transported by the steam flow, characterized in that it comprises a lime scale disposal orifice that communicates with a portion of the steam distribution circuit located upstream of the filter and that the filter is fixedly mounted in the appliance or is removable via an orifice separate from the lime scale disposal orifice.

The appliance thus constructed has the advantage of having a lime scale disposal orifice that enables the removal of lime scale particles present in the steam distribution circuit.

According to another feature of the invention, the filter is configured to contain the lime scale particles in a lime scale collection cavity.

Such a feature makes it possible to collect the lime scale particles in an area of the device dedicated to this purpose, thus making it easier to remove them via the lime scale disposal orifice.

According to another feature of the invention, the filter is composed of a screen with openings smaller than 0.6 mm in side length, and advantageously less than 0.4 mm in side length, the screen advantageously having a total filtration surface area greater than 5 $cm^2$ and preferably greater than 8 $cm^2$.

The reduced size of the openings only allows lime scale particles that are barely visible or invisible to the naked eye to pass through the steam outlet holes. The large surface area of the filter in turn makes it possible to provide a total passage section through the filter pores of sufficient magnitude for maintaining an acceptable steam flow rate despite a partial plugging of the filter. Furthermore, such a filtration surface makes it possible to obtain load losses compatible with the dispensing of a steam flow that is advantageously greater than 20 g/min and preferably greater than 30 g/min with a steam generator composed of an instantaneous steam generation chamber supplied in a conventional manner by a drip valve.

According to another feature of the invention, the lime scale disposal orifice is closed by a removable stopper that can be accessed from the outside of the appliance.

According to another feature of the invention, the filter is disposed in a portion of the steam distribution circuit where the steam flow makes a sharp change in direction of preferably at least 90°.

Such a feature has the advantage of limiting the clogging speed of the filter, the heaviest particles being conveyed by their inertia out of the filter and into a storage area.

According to another feature of the invention, the filter is held by a frame removably mounted in a housing.

Advantageously, sealing means are disposed at the interface between the frame and the housing.

Such a feature makes it possible to prevent the steam flow from passing between the frame and the housing.

According to another feature of the invention, the appliance comprises a removable lime scale collection container that is introduced into the lime scale collection cavity via the lime scale disposal orifice.

Such a feature has the advantage of making it possible to empty the lime scale simply by pulling out the lime scale collection container.

According to another feature of the invention, the steam outlet holes are formed in a soleplate of an iron.

According to another feature of the invention, the steam flow traveling in the steam distribution circuit flows through the filter from the bottom up when the iron is resting horizontally on its soleplate.

Such a feature has the advantage of blocking the particles against the bottom side of the filter such that the particles become detached from the filter under the effect of gravity when the steam flow stops.

According to another feature of the invention, the ironing appliance comprises an instantaneous steam generation chamber.

Such a feature has the advantage of providing a simple structure for generating steam.

According to another feature of the invention, the filter has a shape and/or a slope that favors the flow of water droplets along the filter; this water droplet flow having the advantage of removing a portion of the lime scale particles adhering to the filter and thus helping to clean it. Hence the filter may have a planar shape and be angled relative to the horizontal, or it may have a non-planar (e.g., curved) shape.

Such a feature has the advantage of causing the water droplets to slide along the curved shape of the filter.

According to another feature of the invention, the lime scale collection container has an open front end via which the steam flow enters and a closed back end; the container comprising a lateral opening via which the steam flow exits toward the steam outlet holes.

Such a feature makes it possible to exploit the carrying effect of the steam flow passing through the container and thus increase the amount of lime scale collected in the container.

According to another feature of the invention, the lime scale collection container bears a gasket that comes into contact with the lime scale collection cavity.

According to another feature of the invention, the lime scale collection container has a storage volume greater than 4 cm$^3$.

Such a feature makes it possible to collect the lime scale particles accumulated between two maintenance intervals, along with any water that was not vaporized in the steam generation chamber, without the filter becoming fouled.

According to still another feature of the invention, the iron comprises a heel on which it can rest during the inactive phases of ironing.

According to another feature of the invention, the instantaneous steam generation chamber is connected to the lime scale collection cavity via an opening formed at the back end of the steam generation chamber; the steam flow produced by the steam generation chamber escaping through the steam distribution circuit via the opening formed in the back of the steam generation chamber.

According to another feature of the invention, the lime scale disposal orifice opens at the heel of the iron.

Such a feature has the advantage of providing ready access to the lime scale disposal orifice when the iron is resting on its soleplate.

According to another feature of the invention, the lime scale collection cavity is cantilevered behind the soleplate when the iron is resting on its soleplate.

Such a feature makes it possible to distance the lime scale collection cavity from the soleplate and thus reduce the burn hazard while manipulating the stopper.

According to another feature of the invention, the iron comprises a tank for dispensing a calcification inhibitor.

BRIEF DESCRIPTION OF THE DRAWINGS

The objects, aspects, and advantages of the present invention will be more clearly understood after reading the following description of a special embodiment of the invention given as a non-limiting example, and by referring to the appended drawings. Shown are.

Only the elements necessary for understanding the invention have been illustrated. For ease in interpreting the drawings, the same elements have the same reference signs from one figure to another.

DETAILED DESCRIPTION OF THE INVENTION

Figure 1:
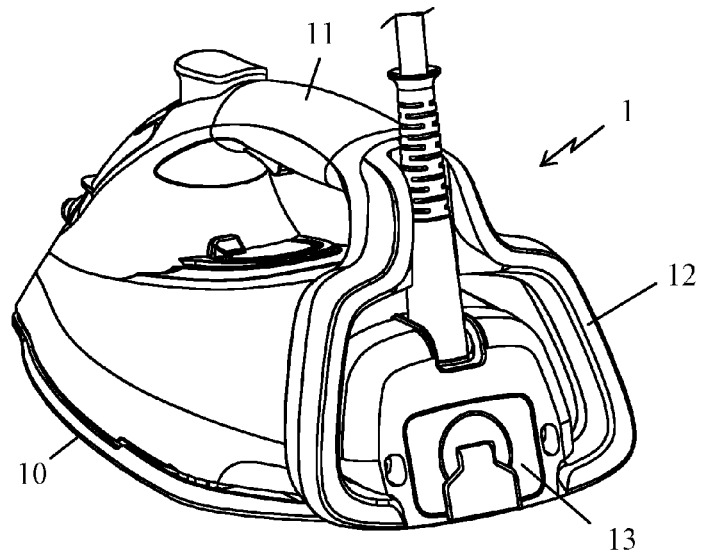
FIG. 1 is a perspective view of an iron according to a first special embodiment of the invention.
Figure 2:
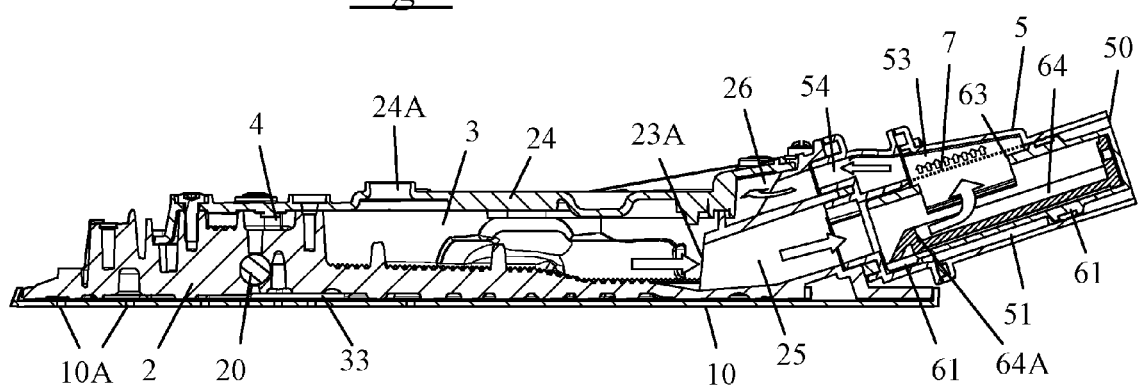
FIG. 2 is a longitudinal sectional view of the heating element and of the soleplate equipping the iron of FIG. 1.

FIG. 1 illustrates a steam iron 1 comprising an ironing soleplate 10 equipped with a set of steam outlet holes 10A that are visible in FIG. 2 only; the soleplate 10 being topped by a plastic casing having a handle 11 on its top end and a heel 12 in its back portion on which the iron can rest essentially upright during the inactive phases of ironing.

The heel 12 comprises two arms that delimit a space between them for receiving a removable stopper 13 giving access to a lime scale disposal orifice 50, which is visible in FIG. 2; the stopper 13 being fastened onto a back side of the casing by means of a bayonet fastening mechanism similar to the one described in greater detail in Patent Application FR2981371 filed by the applicant; the back side of the casing sloping slightly forward to provide easier access when the iron is resting horizontally on its soleplate 10.

Figure 3:
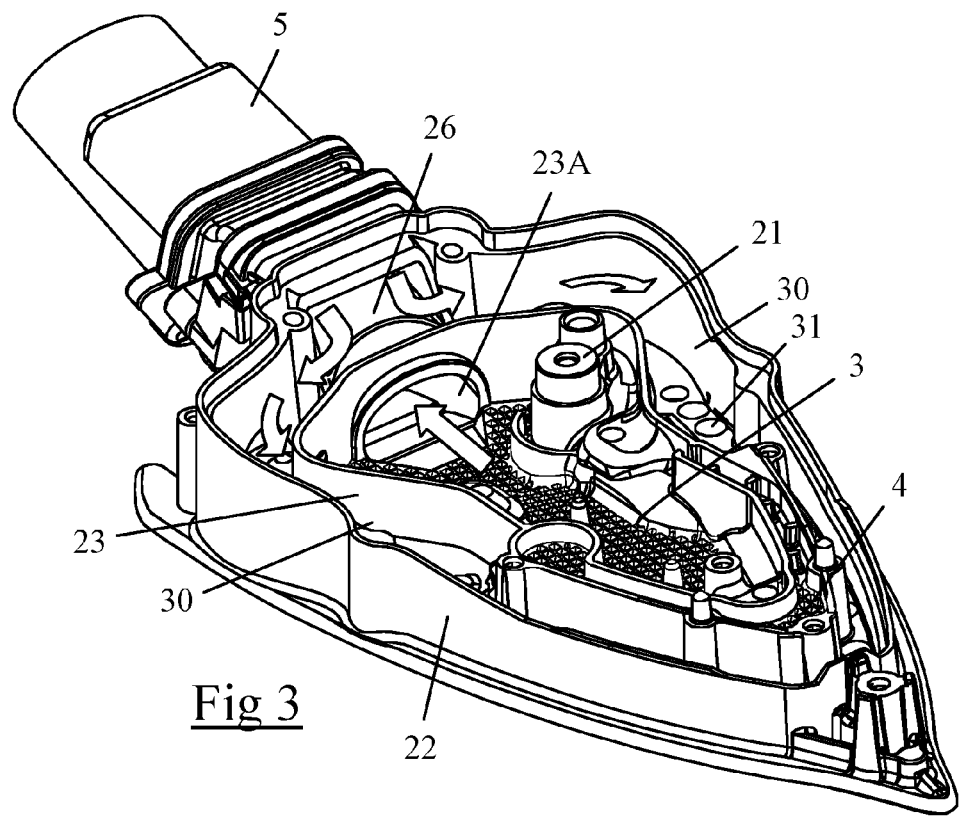
FIG. 3 is a perspective view of the heating element of FIG. 2, with its cover removed.
Figure 4:
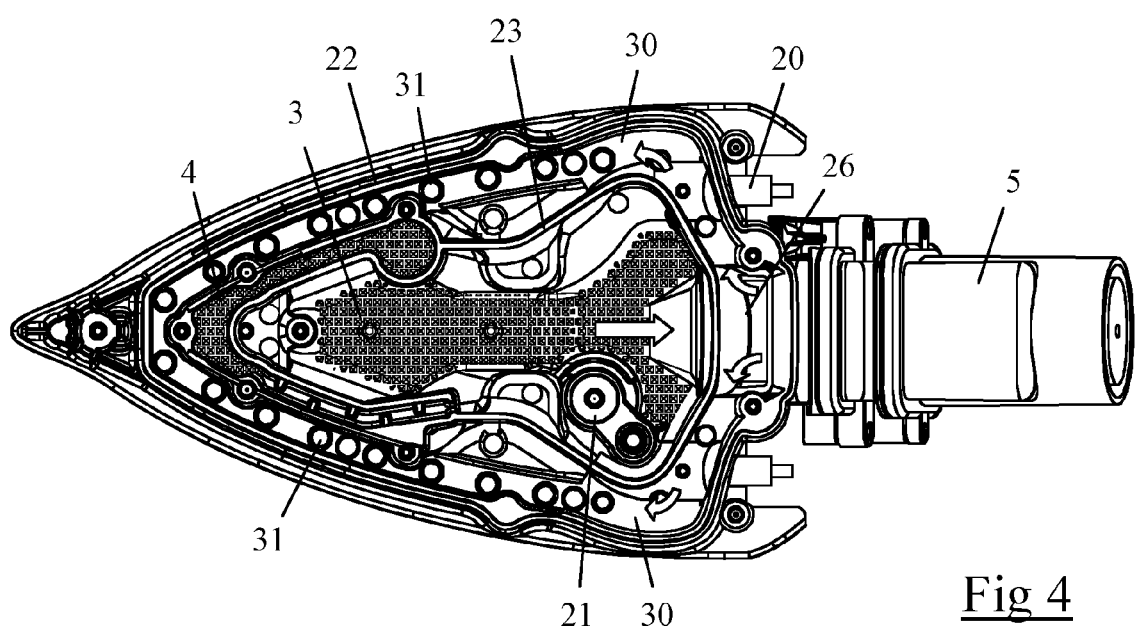
FIG. 4 is a view from above of the heating element of FIG. 2.

According to FIGS. 2 through 4, the soleplate 10 of the iron is thermally and mechanically connected to a heating element 2 integrated in the bottom portion of the casing; the heating element 2 comprising an aluminum casting having, in a conventional manner, a horseshoe-shaped resistor element 20 and a boss 21 (visible in FIG. 3) provided for accommodating a thermostat for controlling the temperature of the soleplate 10.

The heating element 2 comprises a peripheral wall 22 that laterally delimits a space having a main steam generation chamber 3 and an instant steam generation chamber 4, comprising a bottom having a plurality of pyramid-shaped posts for increasing the heat exchange surface area.

The steam generation chamber 3 is disposed in the center of the heating element 2 and is connected to the steam outlet holes of the soleplate 10 via a steam distribution circuit having two lateral channels 30 extending on both sides of the steam generation chamber 3 and reconnecting at the front end and at the back end of the heating element 2; the lateral channels 30 comprising, in a conventional manner, orifices 31 passing through the heating element 2 and leading to the bottom surface of the heating element, specifically to steam distribution cavities 33, which are visible in FIG. 2 and which are arranged facing the steam outlet holes 10A of the soleplate.

Figure 5:
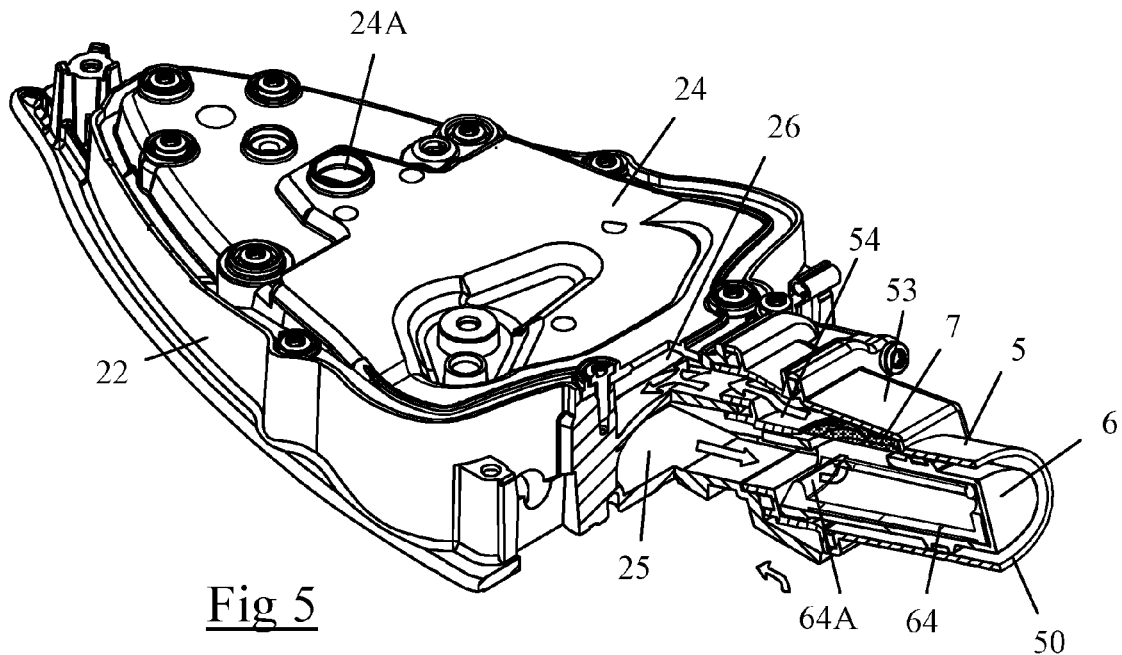
FIGS. 5 and 6 are partially cutaway perspective views of the heating element of FIG. 2 with and without the lime scale collection container, respectively.

According to FIGS. 2 and 5, the heating element 2 also comprises a closing plate 24 that rests on the top edge of the peripheral wall 22; this closing plate 24 being topped by a water tank (not shown in the figures) integrated in the casing of the iron and supplying the steam generation chamber 3 with water via an orifice 24A of the closing plate 24 accommodating, in a manner known per se, a drip valve (not shown in the figures) enabling the production of a continuous steam flow of ca. 40 to 70 g/min.

The steam generation chamber 3 is laterally delimited by a partition 23 rising up to the closing plate 24 and connected in an airtight manner to the latter in such a way that the steam produced in the steam generation chamber 3 can only escape via an opening 23A formed in the partition 23 at the back end of the steam generation chamber 3.

As can be seen in FIG. 2, the opening 23A of the partition leads to a pipe 25 with an essentially oblong cross section formed in the casting of the heating element 2; this pipe 25 extending obliquely relative to the plane of the soleplate 10, forming a ca. 20° angle and extended by a manifold 5 integrated in the casing of the iron 1, said manifold 5 being made of a plastic such as PPS (polyphenylene sulfide).

The manifold 5 comprises a lime scale collection cavity 51 extending axially in the extension of the pipe 25 and leading to the heel 12 of the iron, specifically to the lime scale disposal orifice 50 closed by the stopper 13, the cavity 51 being cantilevered behind the soleplate 10 when the iron is resting on its soleplate 10 and having an oblong cross section.

Figure 6:
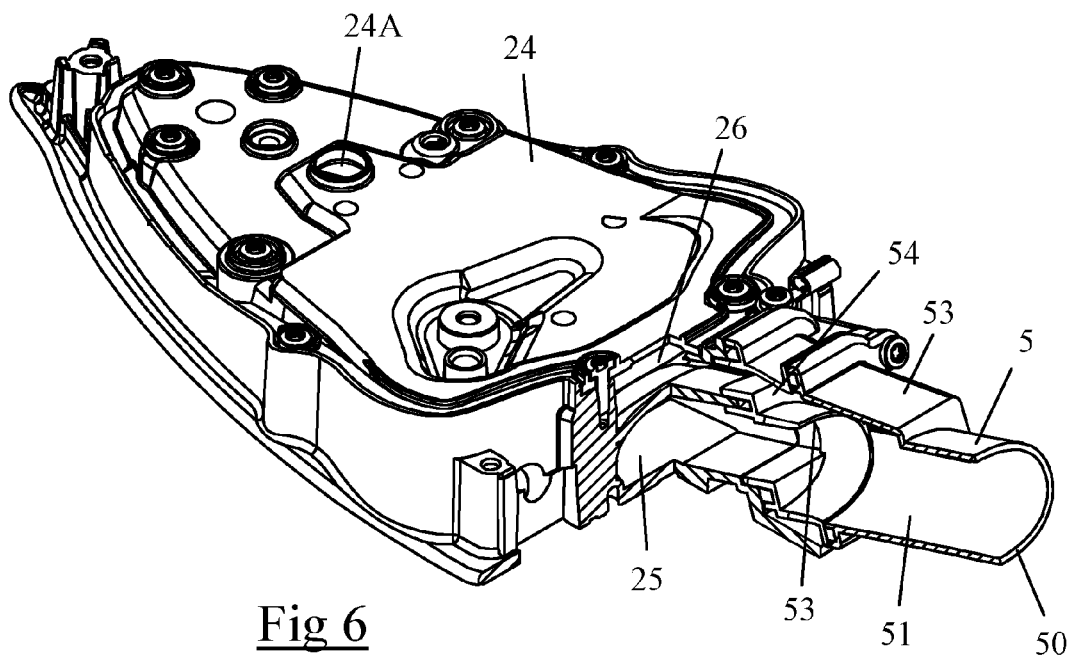

As can be seen in FIGS. 2 and 6, the manifold 5 comprises an exhaust manifold 53 in the top portion of the lime scale collection cavity 51; this exhaust manifold 53 opening into a return channel 54 extending above the pipe 25 and opening into a distribution chamber 26 disposed at the intake of the two lateral channels 30.

Figure 7:
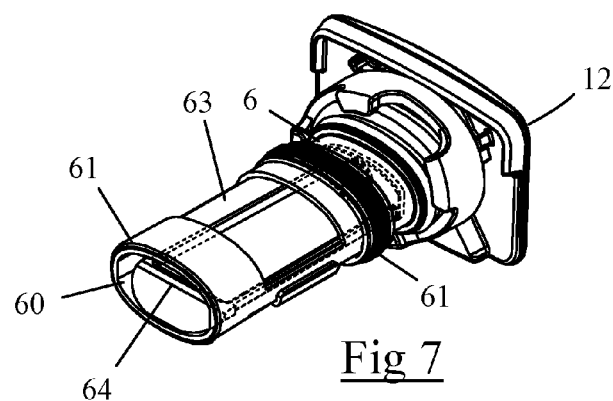
FIG. 7 is a perspective view of the lime scale collection container fastened onto the stopper equipping the iron of FIG. 1.

According to FIGS. 5 and 7, the lime scale collection cavity 51 accommodates a removable lime scale collection container 6 having a shape complementary to that of the lime scale collection cavity 51, wherein the lime scale collection container 6 can be removed from or introduced into the cavity 51 via the lime scale disposal orifice 50. The container 6 comprises an open front end 60, via which the steam flow emitted by the steam generation chamber 3 is admitted into the container 6, and a closed back end, which is advantageously fastened onto the stopper 13 as illustrated in FIG. 7. The container 6 has a bottom portion equipped with a lime scale retaining scoop 64 comprising a hollow portion in which the lime scale particles are stored; the front end of the scoop having a step 64A for preventing the lime scale collected in the scoop 64 from returning by gravity to the steam generation chamber when the iron 1 is set on its soleplate 10.

The container 6 is preferably made of 30% glass fiber-reinforced polyamide PA6-6 plastic and holds a silicone gasket 61 contacting the bottom wall of the lime scale collection cavity 51 near the lime scale disposal orifice; the container 6 comprising, upstream of the gasket 61, an opening 63 formed in the top half facing the exhaust manifold 53 of the lime scale collection cavity 51 when the container 6 is introduced into the cavity 51 all of the way.

According to FIG. 5, the exhaust manifold 53 comprises an intake opening having a filter 7 composed of a curved filter screen extending over the entire area of the intake opening; this filter screen 7 being fastened on the rim of the opening and advantageously having a water-repellent and/or non-stick coating of, for example, PTFE (polytetrafluoroethylene).

The filter screen 7 has openings suitable for retaining the largest lime scale particles and has an appropriate size for providing a sufficient cross section for the required steam flow.

For example, the screen 7 may comprise square openings with a side length less than 0.6 mm, and preferably between 0.1 mm and 0.4 mm, with preference given to the surface area of the screen being greater than 8 $cm^2$ for 0.2 mm square openings and an expected steam flow of ca. 40 to 50 g/min. The screen 7 is advantageously made of stainless steel filament with a diameter of ca. 0.1 mm or smaller.

The screen 7 disposed in this manner has the advantage of being sufficiently distanced from the steam generation chamber 3 such that the boiling water in the steam generation chamber 3 will not foul the filter screen 7 by splattering. Furthermore, the positioning of the screen 7 at the intake of the exhaust manifold 53 helps prevent it from becoming fouled by water that may reach the cavity 51 as a result of the incomplete vaporization of the water injected into the steam generation chamber 3 during an ironing session when the iron is resting on its soleplate 10.

The distancing of the filter screen 7 relative to the steam generation chamber 3, as well as the use of plastics for the manifold 5 and for the container 6, also have the advantage of enabling a relatively low temperature of around 100° C. to be obtained in the vicinity of the screen 7, thus avoiding a strong vaporization of the water that may reach the zone of the container 6 located beneath the screen 7.

In a preferential manner, the opening 63 is distanced from the back end of the container 6 in such a way as to give rise a storage volume of around 4 to 5 $cm^3$ in the container 6 into which the particles of lime drop when the iron 1 is set upright on its heel 12.

The dynamics of the steam flow in the iron 1 thus configured shall now be described.

When the water emitted from the drip valve comes in contact with the bottom of the steam generation chamber 3, it vaporizes instantaneously, causing the discharge of a steam flow represented by arrows in FIGS. 2 through 5, which escapes via the opening 23A of the partition 23 and then flows in succession through the outlet pipe 25, the container 6, the screen 7, the return channel 54, and the lateral channels 30. The steam flow then passes through the orifices 31 in order to reach the bottom side of the soleplate 10 and escape via the outlet holes 10A of the soleplate.

The evaporation of the water causes a calcium carbonate layer to form in the bottom of the steam generation chamber 3, which gradually breaks up into small particles of lime scale, chiefly due to the retraction of the heating element 2 during the cooling phases between two ironing sessions.

The lime scale particles that form in the steam generation chamber 3 are gradually carried away by the steam flow in the pipe 25 and to some extent are routed by their inertia into the bottom of the lime scale collection container 6, where they become trapped in such a way that they drop by gravity into the scoop 64 and are to some extent routed towards the screen 7. This inertial separation of the line particles is brought about chiefly by the ca. 90° turn effected by the steam flow at the intake of the screen 7.

The displacement of the lime scale particles toward the container 6 is also effected by gravity each time the iron 1 is set on its heel 12; the storage volume formed in the bottom of the container 6 being adapted to receive the lime scale particles along with any water drops, without the latter coming into contact with the screen 7, thus preventing the fouling of the screen 7.

The lime scale particles that are carried by the steam flow toward the screen 7 and which have a size greater than that of the openings of the screen 7 are trapped beneath the screen 7; only the finest lime scale particles that are practically invisible to the naked eye are able to pass through the screen 7 and escape via the steam outlet holes of the soleplate 10.

When the steam stops, most of the particles trapped by the screen 7 drop by gravity into the scoop 64 of the container 6. However, some particles may remain stuck on the screen 7 and contribute to the gradual clogging thereof; the screen 7 also becoming calcified due to the evaporation of any water droplets coming into contact with the screen 7.

When it is necessary to clean the iron 1, for instance after several steam ironing sessions or when a warning signal on the iron is activated, the user can easily remove the majority of the lime scale present in the iron by setting the iron 1 horizontally on its soleplate 10 such that the stopper 13 is readily accessible, and then taking the collection container 6 out of the cavity 51 by unlocking the stopper 13 and moving it rearwards so as to cause the container 6 to slide axially through the lime scale disposal orifice 50.

During this removal of the container 6, the lime scale is retained in the scoop 64 owing to the hollow shape thereof and to the presence of the step 64A near the front end of the scoop.

The contents of the container 6 can then be emptied and the container 6 can be cleaned with running water from a faucet.

The iron thus configured therefore has the advantage of ensuring very effective lime scale particle filtering owing to the presence of the filter screen, making it possible to avoid spraying very large lime scale particles onto the laundry. Furthermore, the iron permits easy disposal of the lime scale particles collected with the lime scale collection container in such a way that the iron is very easily maintained in a sufficiently clean condition for ensuring the ideal operation of the iron and especially of the steam generation chamber. The iron obtained in this fashion thus has the advantage of having an improved useful life in which high-level ironing performance is maintained.

Figure 8:
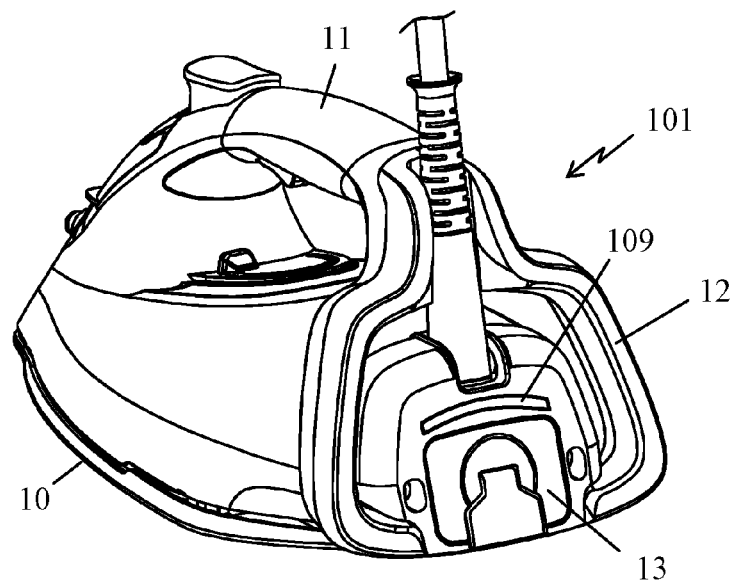
FIG. 8 is a perspective view of an iron according to a second embodiment of the invention.
Figure 9:
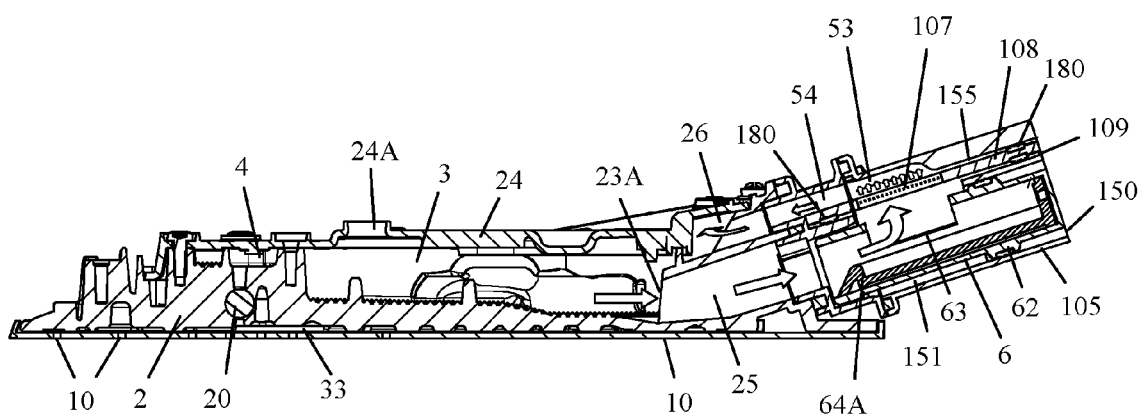
FIG. 9 is a longitudinal sectional view of the heating element and of the soleplate equipping the iron of FIG. 8.

FIGS. 8 and 9 illustrate a second embodiment of the invention corresponding to an alternative implementation of the first embodiment described in FIGS. 1 through 7. For a better understanding of the invention, the components of the appliance remaining unchanged relative to the first embodiment have the same numbering; only those components that underwent development are renumbered According to these figures, the iron 101 according to this second embodiment differs from the iron 1 according to the first embodiment in that it comprises a filter composed of a screen 107 removably mounted on the casing of the iron, the screen 107 having openings and a surface similar to those described for the screen 7 of the first embodiment.

The screen 107 is held by a rigid frame 108 removably mounted in a housing 155 formed in a manifold 105 forming the extension of the pipe 25 of the heating element 2; the manifold 105 has a lime scale collection cavity 151 extending axially in the extension of the pipe 25 and leading to the heel 12 of the iron, specifically to a lime scale disposal orifice 150.

As can be seen in FIG. 9, the housing 155 is disposed above the lime scale collection cavity 151 and leads to the heel 12 of the iron, specifically to an opening 109 separate from the lime scale disposal orifice 150.

The frame 108 is advantageously made of a 30% glass fiber-reinforced polyamide PA 6-6 plastic and holds silicone gaskets 180 contacting the inner wall of the housing 155 in order to seal the connection and in particular to prevent the steam flow from escaping via the opening 109.

The frame 108 is advantageously equipped with a pull tab (not shown in the figures) for facilitating its removal from and insertion into the housing 155.

In this second embodiment and exactly as in the first embodiment, the steam produced by the steam generation chamber 3 escapes via the pipe 25 and then into the cavity 151 by passing through the open front end of the lime scale collection container 6; the steam then passing in succession via the lateral opening 63 and through the screen 107 before being disseminated toward the steam outlet holes 10A of the soleplate.

Consequently, the lime scale particles that are carried by the steam flow toward the screen 107 and which have a size greater than that of the openings of the screen 107 are trapped beneath the screen 107; only the finest lime scale particles are able to pass through the screen 107 and escape via the steam outlet holes 10A of the soleplate.

In this embodiment, the screen 107 has the advantage of being easy to remove from the appliance by taking out the frame 108 via the opening 109 formed on the back side of the iron.

Hence the user, either on his or her own initiative or when prompted to do so by a sound or visual alarm, can check the state of cleanness of the screen 107 and then clean said screen 107 if necessary, wherein scraping means can advantageously be provided on the inner wall of the housing 155 so that with each insertion and removal of the frame 108 the screen 107 is scraped, thus helping to clean it.

The appliance according to this embodiment may also be sold with several frames 108 equipped with screens 107, which may either be identical for allowing the user to swap a frame 108 equipped with a clogged screen with one equipped with a new or cleaned screen 107, or have different filtering capacities in order to adapt the filtering scale to the user's need; these frames equipped with screens can also be sold as replacement parts.

Obviously the invention is not limited in any way to the embodiment described and illustrated in the preceding, which was given merely as an example. Modifications are still possible, in particular from the standpoint of the constitution of the various elements or by substituting equivalent techniques without exceeding the scope of protection of the invention in any way.

Hence, in a non-illustrated alternative embodiment of the invention, the filter may be taken out of the appliance via an opening leading to the side of the iron.

Hence, in a non-illustrated alternative embodiment, the water tank may comprise a device for dispensing a calcification inhibitor such as a phosphonate compound, a sodium hexametaphosphate compound, or a biodegradable calcification inhibitor such as the one described in the patent application filed by the applicant under application number FR1453381.

Hence, in a non-illustrated alternative embodiment, the steam generation chamber can be thermally decoupled from the soleplate, wherein the latter can comprise its own heating element.

The invention claimed is:

1. An ironing appliance comprising a steam distribution circuit having at least one filter designed to retain lime scale particles transported by the steam flow, wherein it comprises a lime scale disposal orifice that communicates with a portion of the steam distribution circuit located upstream of the filter and that said filter is fixedly mounted in the appliance or is removable via an orifice separate from the lime scale disposal orifice,
  wherein the lime scale disposal orifice is closed by a removable stopper that can be accessed from the outside of the appliance.

2. The ironing appliance as in claim 1, wherein the filter is configured for containing the lime scale particles in a lime scale collection cavity.

3. The ironing appliance as in claim 1, wherein the filter is composed of a screen with openings smaller than 0.6 mm in side length; the screen advantageously having a total filter surface area greater than 5 cm$^2$.

4. The ironing appliance as in claim 1, wherein the filter is disposed in a portion of the steam distribution circuit where the steam flow makes a sharp change in direction.

5. The ironing appliance as in claim 1, wherein the filter is held by a frame that is removably mounted in a housing.

6. The ironing appliance as in claim 5, wherein sealing means are disposed at the interface between the frame and the housing.

7. The ironing appliance as in claim 1, wherein it comprises a removable lime scale collection container that is introduced into the lime scale collection cavity via the lime scale disposal orifice.

8. The ironing appliance as in claim 1, wherein the steam outlet holes are formed in an ironing soleplate of an iron.

9. The ironing appliance as in claim 8, wherein the steam flow traveling in the steam distribution circuit flows through the filter from the bottom up when the iron is resting horizontally on its soleplate.

10. The ironing appliance as in claim 1, wherein it comprises an instantaneous steam generation chamber.

11. The ironing appliance of claim 4, wherein the sharp change in direction of the steam flow is at least 90°.

* * * * *